United States Patent [19]
Parsons et al.

[11] Patent Number: 5,976,287
[45] Date of Patent: Nov. 2, 1999

[54] METHOD AND APPARATUS OF STUD ARRAY UPSTAND SETTING

[75] Inventors: Barry Frederick Parsons, Eastwood; Stephen John Barker, Marsfield; Donald Edward Yabsley, Carlingord; Michael John Leighton Kesteven, Narrabri; Trevor Stanley Bird, Eastwood; Vincent Miguel Harrigan, deceased, late of Chittaway Point, all of Australia, by William Raymond Orvad, executor

[73] Assignee: Commonwealth Scientific and Industrial Research Organisation, Campbell, Australia

[21] Appl. No.: 08/356,391

[22] PCT Filed: Jun. 17, 1993

[86] PCT No.: PCT/AU93/00288

§ 371 Date: Jul. 12, 1996

§ 102(e) Date: Jul. 12, 1996

[87] PCT Pub. No.: WO94/00734

PCT Pub. Date: Jan. 6, 1994

[30] Foreign Application Priority Data

Jun. 23, 1992 [AU] Australia .................................. PL3095

[51] Int. Cl.⁶ .................................................. B32B 31/00
[52] U.S. Cl. .......................... 156/64; 156/245; 156/350; 343/700 R; 343/912; 343/915

[58] Field of Search ............................. 156/64, 245, 350, 156/358; 343/700 R, 757, 777, 912, 915

[56] References Cited

U.S. PATENT DOCUMENTS

| | | |
|---|---|---|
| 3,649,122 | 3/1972 | Holtz ............................................. 356/4 |
| 3,897,294 | 7/1975 | MacTurk ................................. 156/245 |
| 4,021,817 | 5/1977 | Shibano et al. .......................... 343/912 |
| 4,496,416 | 1/1985 | Machler et al. ......................... 156/293 |
| 4,574,457 | 3/1986 | Farnum, III ............................. 29/469.5 |
| 4,731,144 | 3/1988 | Kommineni et al. ................... 156/245 |
| 4,845,510 | 7/1989 | Chang et al. ........................ 343/915 X |
| 5,063,389 | 11/1991 | Reits .................................... 343/915 X |

Primary Examiner—David A. Simmons
Assistant Examiner—Paul M. Rivard

[57] ABSTRACT

An apparatus and method for setting the upstand height of the studs of an array of studs used to form antenna panels is disclosed. The apparatus includes a transducer beam having a row of spaced-apart distance transducers. The apparatus also includes an actuator beam having a row of spaced rotary actuators. The actuators rotate the threaded studs to raise or lower the studs until the corresponding transducer indicates that the stud has achieved an intended height. Also disclosed is a method using an array of laser diodes, rather than the transducer beam, arranged at one end of the base plate and an array of photo diodes at the opposite end. The output of the diodes indicates the height of the studs.

13 Claims, 7 Drawing Sheets

METHOD AND APPARATUS OF STUD ARRAY UPSTAND SETTING

The present invention relates to an array of studs used to form reflector antenna panels. Because such studs normally take the form of bolts having threaded shanks, such an array is often referred to as a "bed of bolts" by analogy to the bed of nails known from the sleeping habits of Indian fakirs.

The array of studs is used to form antenna panels and, in particular, those panels which are curved in two dimensions. Essentially the studs or bolts are each set to an individual height which correspond to the desired shape of the panel for the location of the relevant bolt. Then the panel is formed by pressing or otherwise conforming the sheet metal panel to the surface determined by the heads, or tops, of the bolts.

BACKGROUND ART

The prior procedure and apparatus used to create such antenna panels is described in the paper "The Australia Telescope Antennas: Development of High-Accuracy Low-Cost Surface Panels" by B F Parsons and D E Yabsley published in October 1985 in the Proceedings of the IREE of Australia (conference (IREECON 85) pp 716–719). A similar arrangement is disclosed in U.S. Pat. No. 4,731,144 issued Mar. 15, 1988 to Kommineni et al. Both these documents disclose arrangements in which the stud height of each stud is adjusted by manually turning the bolt which forms the stud. This manual adjustment is a very time consuming, and therefore and expensive, procedure.

SUMMARY OF THE INVENTION

It is the object of the present invention to provide both a method and apparatus whereby the stud height setting procedure can be, at least to some extent, automated. The purpose in so doing is two-fold, firstly to reduce the time involved in the setting procedure, and secondly to increase the accuracy of the set stud heights by the elimination of human error.

According to one aspect of the present invention there is disclosed a setting apparatus for setting the upstand distance of studs of an array of studs used to form antenna panels, said array comprising a generally planar bed having a plurality of studs extending substantially normally to the plane of said bed and to opposite sides thereof, said studs being arranged in a plurality of adjacent rows of substantially equal length with a predetermined spacing between each pair of adjacent studs in a row, each of said studs being of adjustable distance relative to one side of said bed, said distance being adjustable by manipulation of a portion of each said stud on the other side of said bed, said setting apparatus comprising two beams each having a length corresponding to the length of said rows, one of said beams being locatable a predetermined distance away from said one side of said bed and aligned with one of said rows, said one beam carrying a plurality of distance transducers facing said studs and arranged at intervals along said one beam corresponding to a first integral multiple of said inter-row adjacent stud spacing and the other of said beams being locatable adjacent to the other side of said bed, aligned with said row, and carrying a plurality of stud upstand adjusting actuators each engageable with said stud portion, said actuators being arranged at intervals along said other beam corresponding to a second integral multiple of said adjacent stud spacing, and feedback means to control the operation of each said actuator in accordance with the output of the corresponding transducer to set said upstand distance of the corresponding stud.

According to a second aspect of the present invention there is disclosed a method of setting the upstand distance of studs of an array of studs used to form antenna panels, said array comprising a generally planar bed having a plurality of studs extending to each side of said bed and arranged in a plurality of adjacent rows of substantially equal length with a predetermined spacing between each pair of adjacent studs, each of said studs being of adjustable distance relative to one side of said bed, said distance being adjustable by manipulation of a portion of each said stud on the other side of said bed, said method comprising the steps of:

(1) engaging a plurality of stud distance adjusting actuators with said stud portion of a corresponding number of said studs in one of said rows, (2) sensing the upstand distance of said corresponding studs in said one row, (3) operating said actuators in accordance with the output of said transducers to set said upstand distance of said corresponding number of studs, and (4) repeating steps (1)–(3) inclusive for the remaining studs, if any, in said one row, and for the remaining rows, in either order, until the upstand distance of all said studs in said array has been set.

Preferably step (2) comprises locating a corresponding plurality of distance transducers a predetermined distance away from said one side of said bed and aligned with said corresponding studs in said one row.

In accordance with a third aspect of the present invention there is disclosed a transducer beam for setting apparatus for setting the upstand distance of studs of an array of studs used to form antenna panels, said array comprising a generally planar bed having a plurality of studs extending to each side of said bed and arranged in a plurality of adjacent rows of substantially equal length with a predetermined spacing between each pair of adjacent studs, each of said studs being of adjustable distance relative to one side of said bed, said distance being adjustable by manipulation of a portion of each said stud on the other side of said bed, said transducer beam having a length corresponding to the length of said rows, having location means to locate said beam a predetermined distance away from said one side of said bed and aligned with one of said rows, and carrying a plurality of distance transducers facing said studs and arranged at intervals along said beam corresponding to an integral multiple of said adjacent stud spacing.

In accordance with a fourth aspect of the present invention there is disclosed an actuator beam for setting apparatus for setting the upstand distance of studs of an array of studs used to form antenna panels, said array comprising a generally planar bed having a plurality of studs extending to each side of said bed and arranged in a plurality of adjacent rows of substantially equal length with a predetermined spacing between each pair of adjacent studs, each of said studs being of adjustable distance relative to one side of said bed, said distance being adjustable by manipulation of a portion of each said stud on the other side of said bed, said actuator beam having a length corresponding to the length of said rows, having location means to locate said beam adjacent the other side of said bed and aligned with one of said rows, and carrying a plurality of stud upstand adjusting actuators each engageable with said stud portion, said actuators being arranged at intervals along said beam corresponding to an integral multiple of said adjacent stud spacing.

BRIEF DESCRIPTION OF THE DRAWINGS

Some embodiments of the present invention will now be described with reference to the drawings in which.

DETAILED DESCRIPTION

Figure 1:
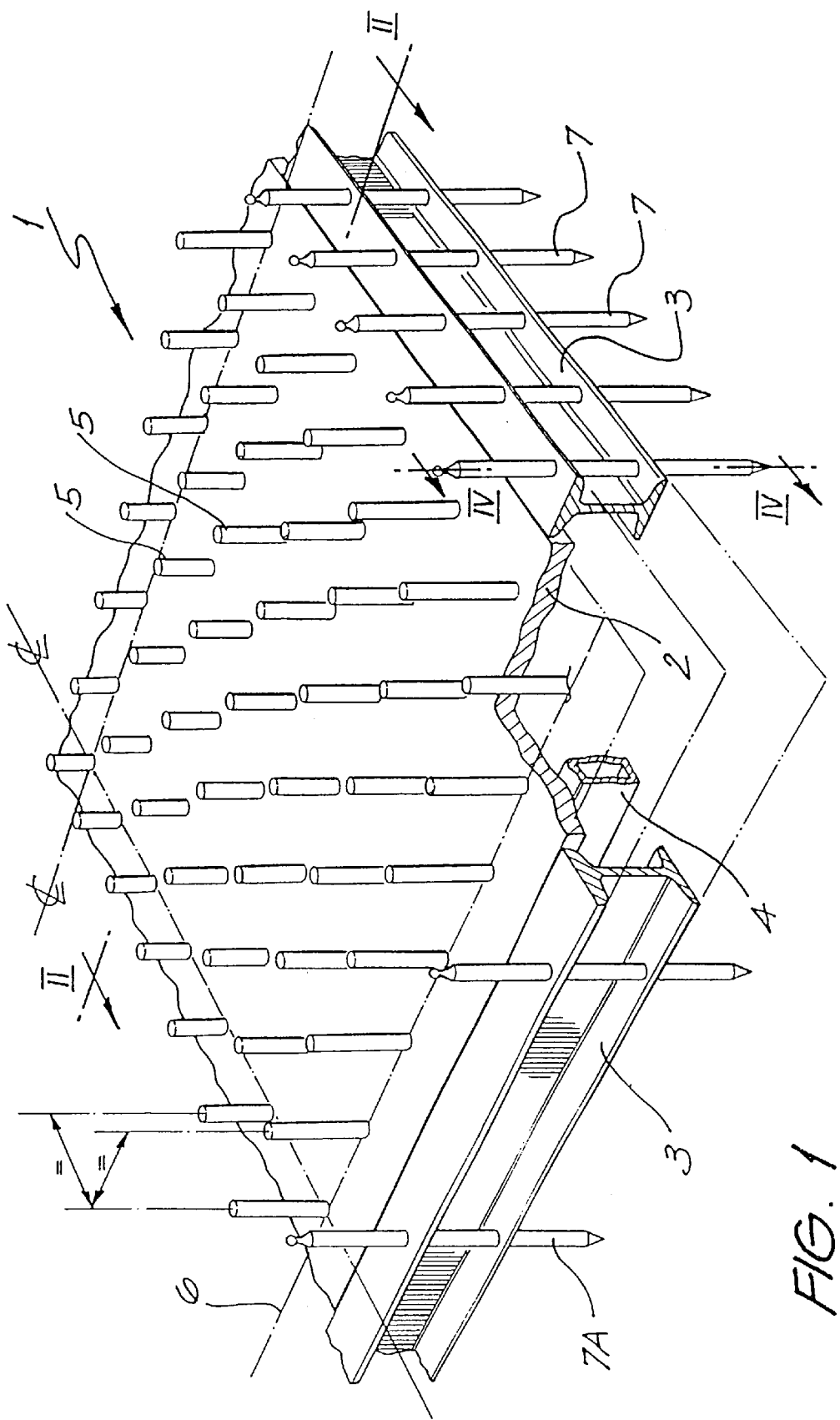
FIG. 1 is a schematic perspective view of the "bed of bolts" of the preferred embodiment, a portion of the bed being cut away.

As seen in FIG. 1, the array 1 takes the form of a base plate 2 of rectangular configuration having peripheral I-beams 3. Extending underneath the base plate 2 are a series of parallel stiffening ribs 4, only one of which is illustrated in FIG. 1.

Arranged across the base plate 2 is a matrix of studs 5 arranged in rows 6. All pairs of adjacent studs 5 within a row 6 have a specified inter-stud spacing which is preferably also equal to the spacing between the rows 6. Located at each end of each of the rows 6 is a row post 7. The row posts 7 are mounted in the I-beams 3 and extend both above and below the base plate 2. The tops of the row posts 7 are maintained at an identical height above the base plate 2. At least two row posts 7A are located on each I-beam 3 parallel to the rows 6.

Figure 2:
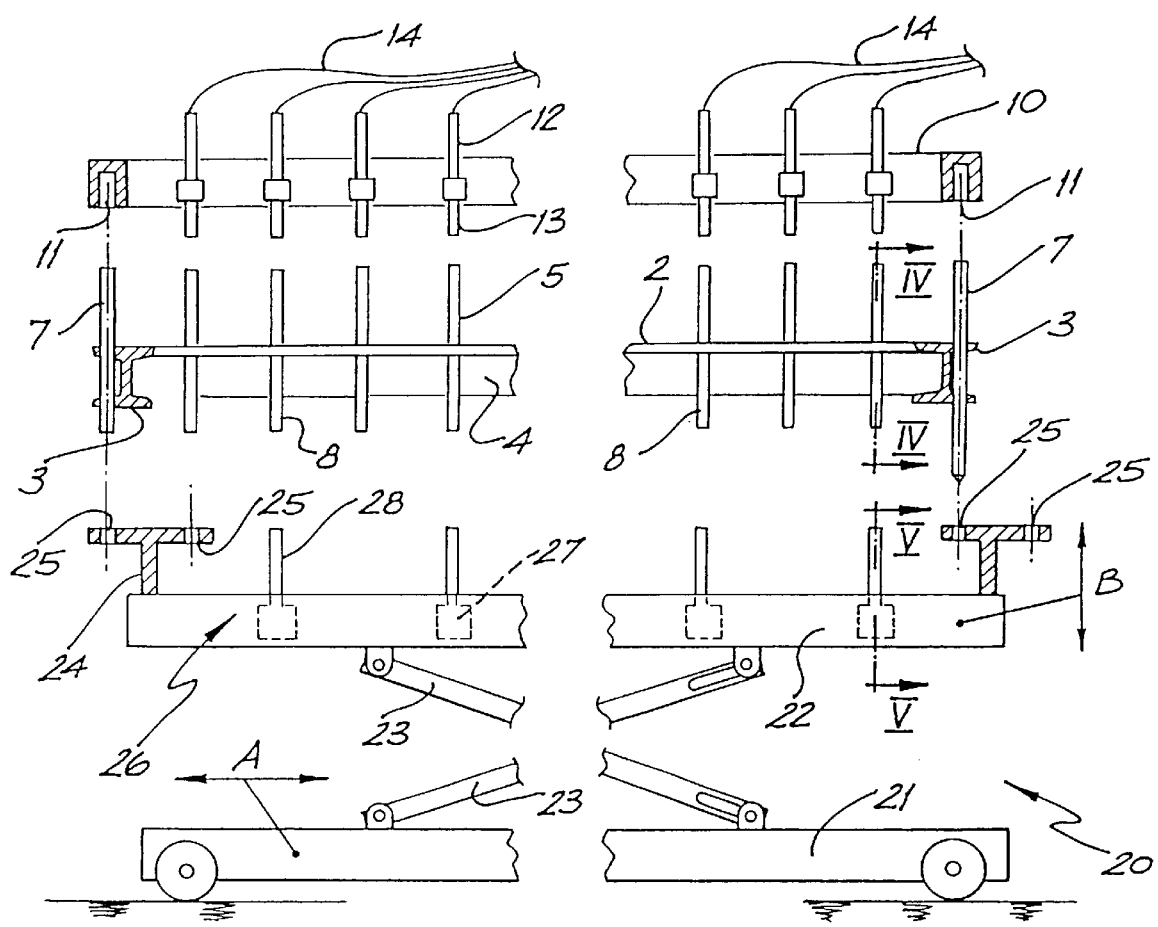
FIG. 2 is a truncated, transverse cross sectional view along the line II—II of FIG. 1 and showing in side elevation, and partly in section, a transducer beam located above the bed and an actuator beam located below the bed.

As seen in FIG. 2, the studs 5 extend below the base plate 2 as well as above it and, as will be described hereafter in more detail, the upstand height of the studs 5 above the base plate 2 can be adjusted by rotation of that portion 8 of the studs 5 which extends below the base plate 2. Essentially this adjustment mechanism arises because of a threaded engagement between the studs 5 and the base plate 2.

Also illustrated in FIG. 2 is a transducer beam 10 which has a length corresponding to the length of each row 6. At each end of the transducer beam 10 is a blind hole 11 into which the upper end of the corresponding row post 7 is able to be inserted. This arrangement enables the transducer beam 10 to be supported by the row posts 7 at a predetermined distance above the base plate 2.

Positioned along the transducer beam 10 with a spacing equal to the inter-stud spacing is an equivalent number of transducers 12. Each transducer 12 includes a vertically slidable plunger 13 and an electrical lead 14 which carries the output of the transducer. The transducers 12 are preferably linear variable differential transducers which are commercially available from Lucas Schaevitz of Pennsauken N.J. USA. The transducers 12 take the form of a coil assembly with a primary winding positioned between a pair of secondary windings and an interior magnetically permeable core. The core is movable with a plunger 13. Thus the transducer 12 produces an electric output which is proportional to the degree of elongation of the plunger 13 towards the bed 2. The electrical leads 14 are taken to an electronic feedback and control device 9 (FIG. 3) which preferably takes the form of a portable computer.

Also illustrated in FIG. 2 is an actuator trolley 20 which takes the form of a wheelled base 21 and an actuator beam 22. The actuator trolley 20 is able to be rolled in the direction indicated by arrows A and the actuator beam 22 is able to be raised and lowered in the direction indicated by arrows B by means of a conventional pivoting scissors linkage 23.

At each end of the actuator beam 22 is a T-shaped location device 24 each of which has a pair of apertures 25 spaced apart by a distance equal to the inter-stud spacing. Each of the apertures 25 is also engageable with the lower end of the row posts 7.

Positioned along the actuator beam 22 and equally spaced are a number of stud upstand adjusting actuators 26 to be described in more detail hereafter. Essentially the actuators comprise a stepping motor 27 and a vertically extending shaft 28 rotatable thereby. The spacing between the actuators 26 is an integral multiple of the inter-stud spacing. In the preferred embodiment the multiple is two. Each of the stepping motors 27 is individually controlled by the substantially conventional feedback and control device 9.

In order to adjust the upstand height of the studs 5 of the row illustrated in FIG. 2, the transducer beam 10 is first lifted into position over the row and maintained at the predetermined height above the base plate 2 by resting on the top of the row posts 7. As a consequence, each of the plungers 13 of the transducers 12 comes into contact with the top of the corresponding stud 5 and thereby sends a signal via its electrical lead 14 to the control computer indicating the upstand height of each of the studs 5. With the actuator trolley 21 wheeled into position under the row, as illustrated in FIG. 2, the actuator beam 22 is raised so as to engage the left hand aperture 25 of each of the pair of apertures 25, with the lower end of the row posts 7. This brings the shaft 28 of each of the actuators 26 into engagement with the portion 8 of the odd numbered studs 5 (counting from the right as seen in FIG. 2).

Once this engagement has been achieved, the stepping motors 27 can be operated to rotate the portions 8 and hence adjust the upstand heights of the studs 5 in accordance with the desired upstand heights determined by the reflector profile to be constructed. The desired heights for each of the studs 5 are stored in the memory 19 of the feedback and control device 9.

After the odd numbered studs 5 have been so adjusted, the actuator beam 22 is lowered and rolled to the left as seen in FIG. 2 in order to align the lower end of the row posts 7 with the right hand apertures 25 as seen in FIG. 2. Because the spacing between the apertures 25 corresponds to the inter-stud spacing, when the actuator beam 22 is then raised this engages the shafts 28 with the portions 8 of the even numbered studs 5 (again counting from the right as seen in FIG. 2). Consequently the even numbered studs 5 can be adjusted by operation of the stepping motors 27 under control of the feedback and control device 9.

Figure 3:
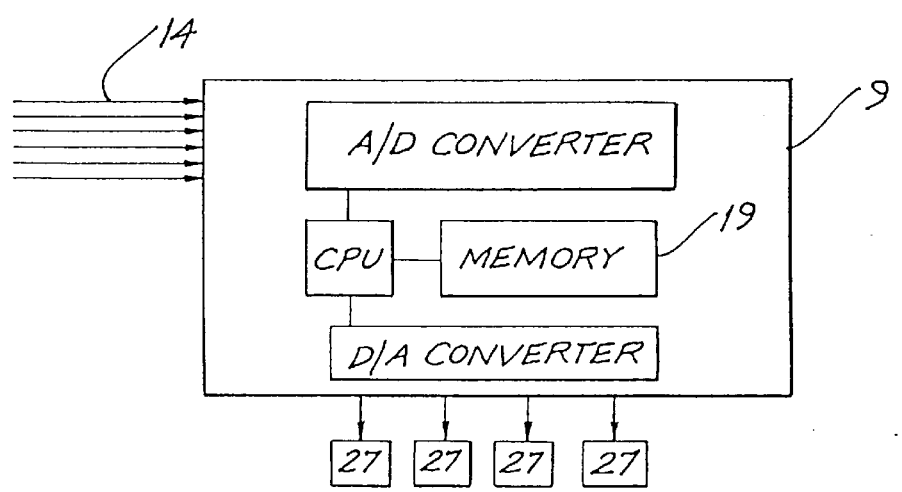
FIG. 3 is a schematic block diagram of a feedback and control arrangement.
Figure 4:
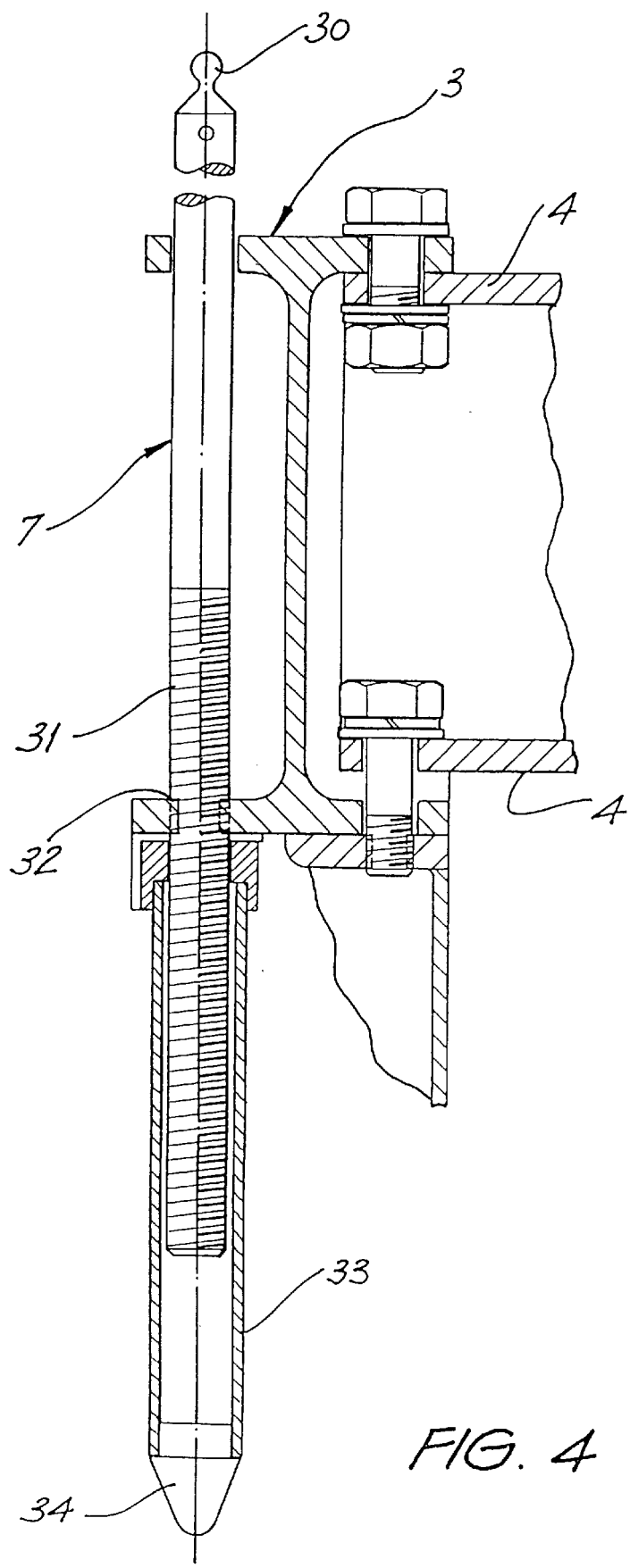
FIG. 4 is a cross sectional view taken along the line IV—IV of FIG. 1.

The foregoing describes the general principle of operation of the preferred embodiment. FIG. 3 Illustrates the basis of the feedback and control device 9 which eventually consists of conventional data aquisition devices including A/D and D/A converters, a CPU and a memory 19. FIG. 4 illustrates the detail of the row posts 7. Each row post 7 consists of a rod having a machined tip 30 and a threaded lower portion 21 which is engaged in a threaded aperture located in the lower flange 22 of the I-beam 3. A sheath 33 is located over the lower portion 31 and is provided with a tapered plug 34 to assist in engagement of the row posts 7 with the apertures 25 of the actuator trolley 20. The row posts 7A are essentially identical.

Figure 5:
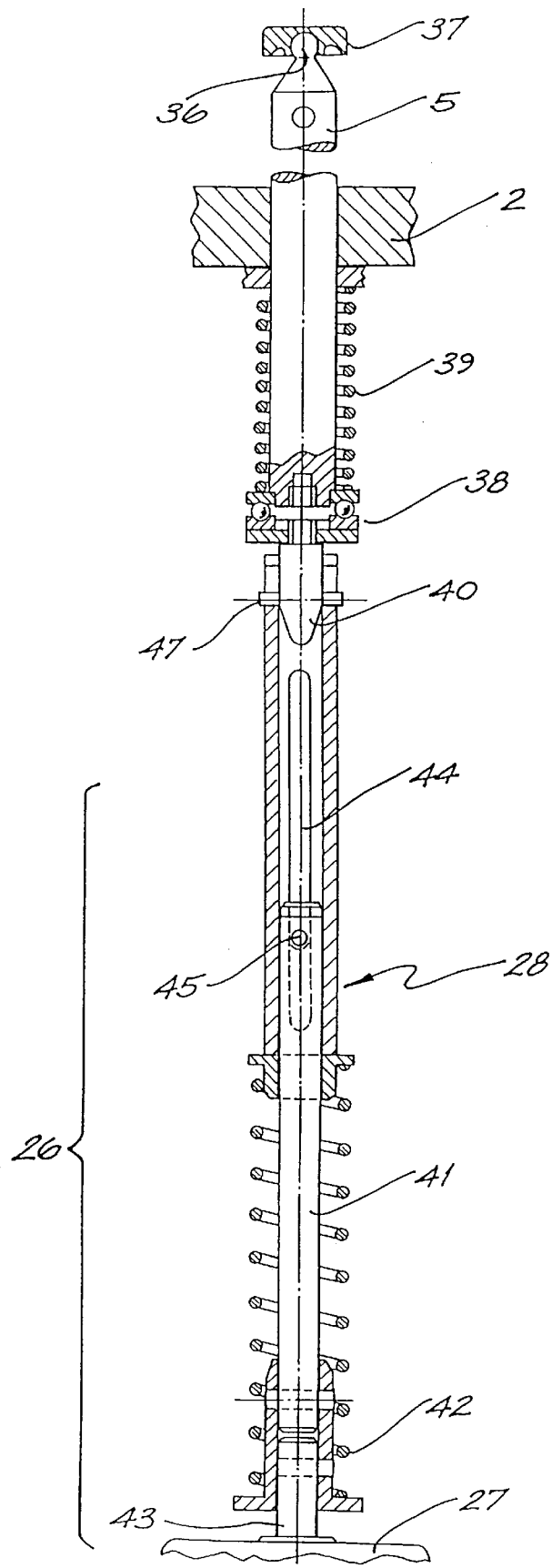
FIG. 5 is a cross sectional view taken along the line V—V of FIG. 2.

One form of construction of the studs 5 and actuators 26 is illustrated in FIG. 5. The studs 5 are externally threaded and threadably engage the base plate 2. The upper end of the studs 5 is provided with a spherical tip 36 onto which is crimped a cap 37 against which the panel to be formed (not illustrated) bears. Positioned on the stud 5 and retained thereon by a bearing 38 is a compression spring 39. A guide tip 40 extends beyond the bearing 38 and is receivable in the interior of shaft 28 which is hollow. The upper end of the shaft 28 is shaped to mate with, and drivingly engage, the shaft 5.

The shaft 28 is itself slidingly mounted on, but rotatable with, a further shaft 41 which is coupled by means of coupling 42 to the shaft 43 of the stepping motor 27. The shaft 28 is provided with a longitudinally extending slot 44 through which a pin 45 in the further shaft 41 extends. Located between the coupling 42 and the shaft 28 is a compression spring 46. In order to permit the stepping motor 27 to fully elevate, or fully lower, the stud 5, the spring 39 should exert a greater force when fully extended, than the spring 46 when fully compressed.

One form of coupling between the hollow shaft 28 and the stud 5 is by means of opposed grooves in the upper end of the shaft 28 which mate with a pin 47 which extends through the guide tip 40.

It will be apparent to those skilled in the art that the above described mechanism enables the shaft 28 to be raised up to, and engaged with, the lower end of the shaft 5, in order to rotate the shaft 5 to either raise or lower it as necessary, and to be disengaged by lowering of the shaft 28.

Figure 6:
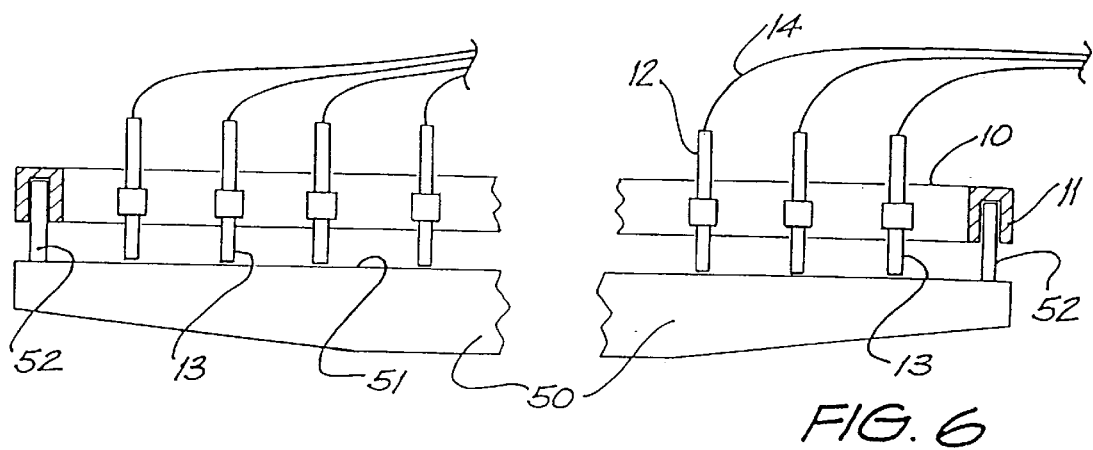
FIG. 6 is a side elevational view illustrating the initial calibration of the transducer beam.

FIG. 6 illustrates apparatus which enables the transducer beam 10 to be calibrated. Essentially this apparatus takes the form of a level plate 50 having an accurately machined upper surface 51 which extends between a pair of upstands 52 which are able to be received in the blind holes 11 of the transducer beam 10. In this way the plungers 13 are able to be set at known, and equal, distances relative to the transducer beam 10 and the bottom of the blind holes 11, in particular.

It will be apparent to those skilled in the art that the transducer beam 10 is also able to be used to set the height of the row posts 7 since, in the preferred embodiment, the distance between the rows 6 corresponds to the distance between the studs 5 within a row. Accordingly, by use of an appropriate spacer, the transducer beam 10 can be supported between the row posts 7 at opposite ends of the I-beams 3, and all the intermediate row posts 7 can be manually set to the desired height.

The preferred sequence for setting the upstand heights is as follows. Firstly, using a surveyor's theodolite, two studs 5 aligned with the end posts 7A (ie. perpendicular to the rows 6) are set to a known upstand distance (provided the relative displacement of one stud to the other is known this is sufficient). Then the transducer beam is set between these two row posts 7A and all the studs 5 under the transducers 12 are set to upstand distances corresponding to the surveyed studs. This sets one stud 5 in each row 6 to a known upstand distance. Next this procedure is repeated for another pair of end posts 7A. This sets two studs 5 in each row at a known relative upstand distance.

After this procedure, after the transducer beam 10 is located on a row 6, the two pre-set studs 5 can provide a datum base line to indicate the level "origin" for that row 6. Then all the studs in that row are set to their desired upstand distance. This procedure is then repeated for each row in turn. Using this procedure and carefully machined studs 5. accuracies better than 10 microns are able to be achieved.

Figure 7:
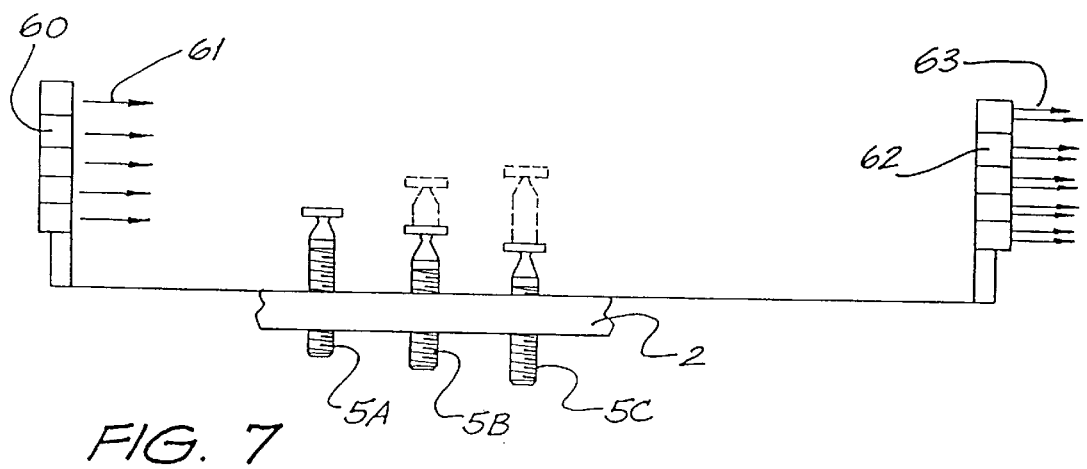
FIGS. 7 & 8 are schematic side elevational views of two alternative methods of setting the stud heights by means of optical and ultrasonic height transducers respectively.

FIG. 7 illustrates a first alternative transducer arrangement. Rather than use the transducer beam 10, an array of laser diodes 60 is located at one edge of the base plate 2 and a like array of photo diodes 62 is located at the opposite edge of the base plate 2. Beams 61 of light from the diodes 60 extend along each row 6 and are interrupted by the first stud 5A. If the subsequent studs 5B, SC, etc are initially lowered, then the height of stud 5A can be set by operating the corresponding actuator 26. The output 63 of the diodes 63 indicate the height of the stud 54.

Then the next stud 5B can be moved into its desired position, indicated by broken lines in FIG. 7, and so on. Clearly it is best to set the lowest height stud first, then the next highest stud, and so on until finally the highest stud in the row is set.

Figure 8:
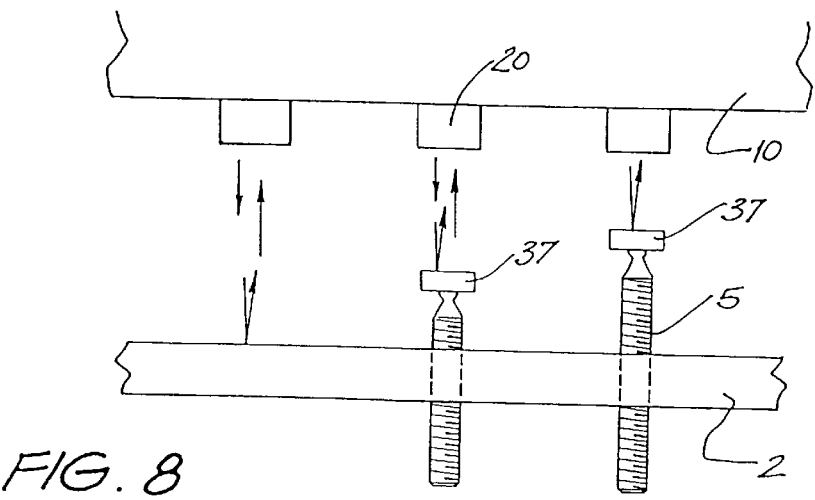

Another alternative transducer arrangement is illustrated in FIG. 8. Here the transducer beam 10 is provided with ultrasonic transceiver transducers 120 which emit a sound wave 121 which bounces off the caps 37 to indicate their position relative to the upper surface of the base plate 2, the position of which is indicated by an additional transducer 120 not aligned with a stud 5.

Figure 9:
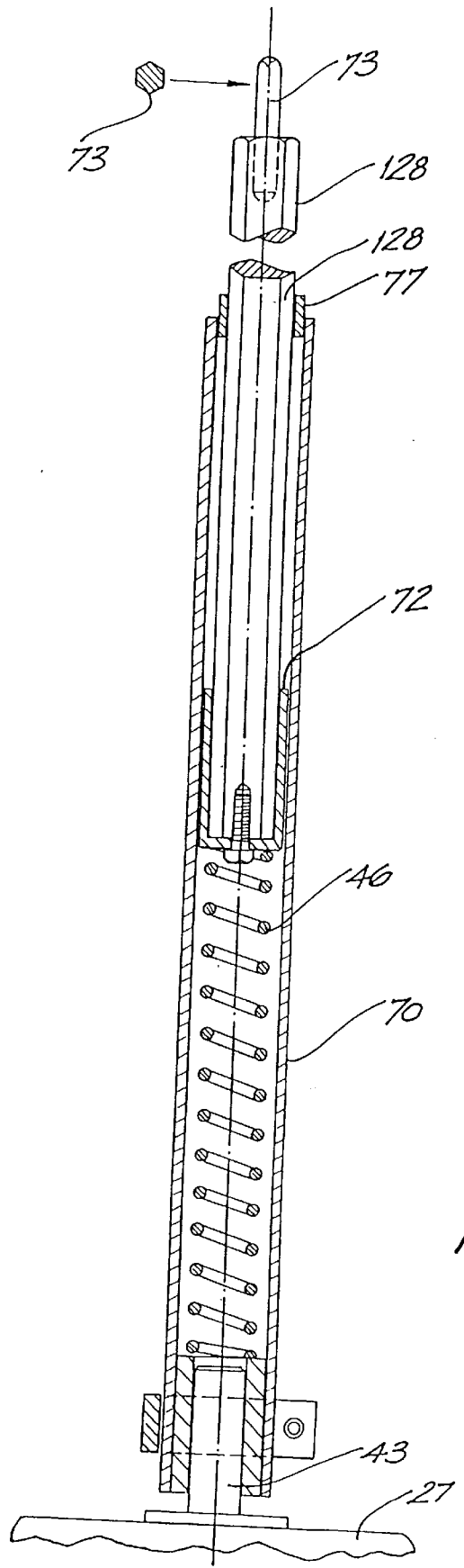
FIG. 9 is a view similar to FIG. 5 but of an alternative form of stud upstand adjusting actuator, and FIG. 10 Is a view similar to FIG. 4 but showing an alternative bolt construction.

As seen in FIG. 9, a preferred construction of the actuator 26 is illustrated. The stepping motor 27 and its shaft 43 are as before. Mounted on the shaft 43 is a hollow tube 70 within which a hexagonal shaft 128 is slidably mounted by means of two bushings 71 and 72. Positioned between the motor shaft 43 and hexagonal shaft 128 is the compression spring 46 as before. At the upper end of the shaft 128 is a tip 73 of hexagonal cross section which is arranged to mate with a like-shaped recess 80 illustrated in FIG. 10 in the lower end of the stud 5.

Figure 10:
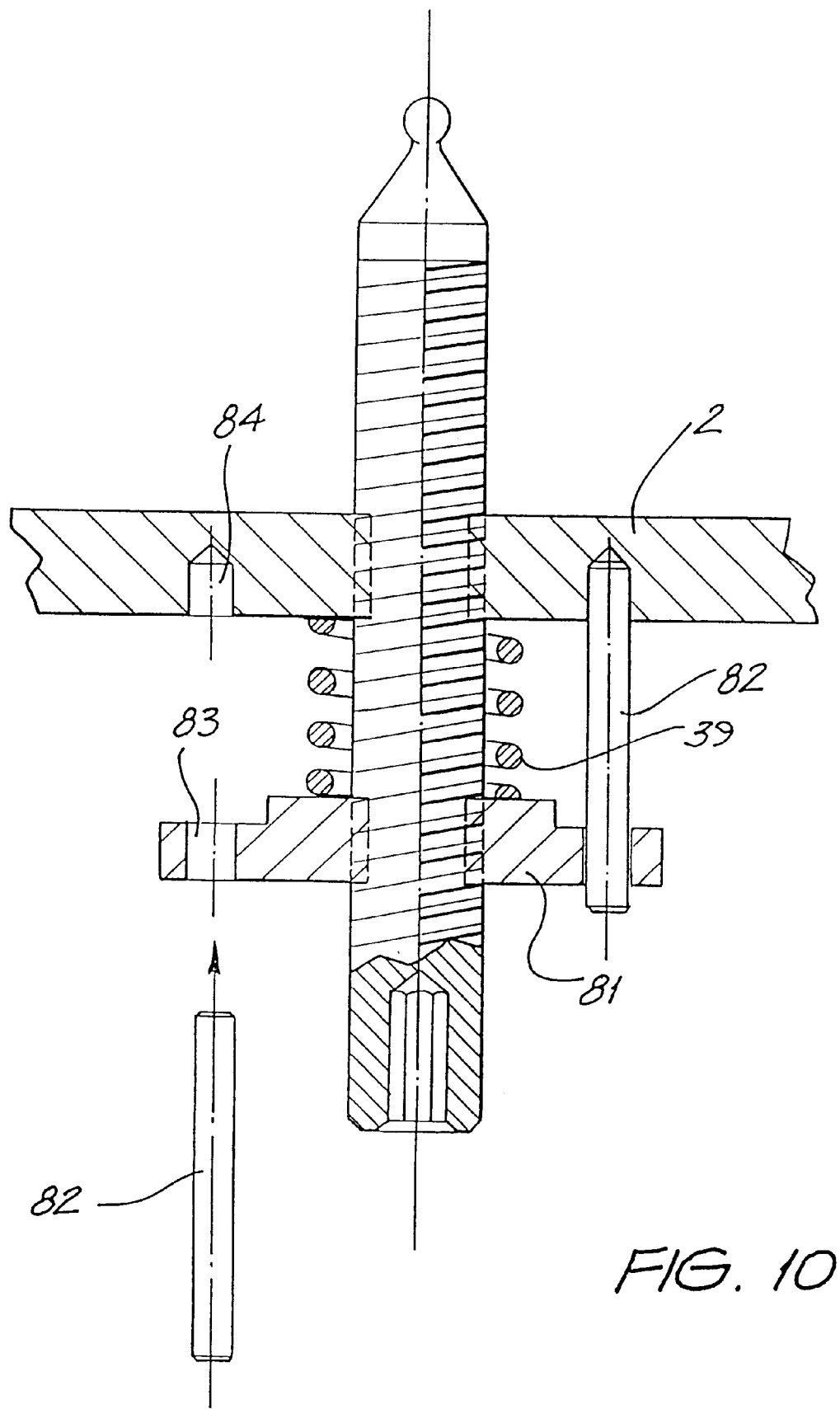

FIG. 10 shows the preferred construction of the stud 5. A threaded washer 81 is used to retain a compression spring 39 as before. The washer is advanced towards the lease plate 2 until the desired degree of compressions of the spring 39 is achieved. Then the washer 81 is prevented from further rotation by the use of two roll pins 82 which are passed through apertures 83 in the washer 81 and into blind holes 84 in the underside of the base plate 2.

The foregoing describes only some embodiments of the present invention and modifications, obvious to those skilled in the art, can be made thereto without departing from the scope of the present invention.

For example, although the number of actuators 26 Illustrated is half the number of studs 5, if stepping motors 27 of sufficiently small diameter are utilised, then the number of actuators 26 can be equal to the number of studs 5. In this case, the actuator trolley 20 would only be required to be positioned once under each row 6. Alternatively, the number of actuators 26 could be one third or one quarter the number of studs 5 in order to reduce the cost of the actuators. Under these circumstances the actuator trolley 20 would be required to be operated in three or four positions respectively in order to completely set all the studs 5 of each row 6.

Similarly, although the number of transducers 12 is illustrated as being equal to the number of studs 5 in a row, the spacing between the transducers could be doubled and the number of transducers thereby halved. Under these circumstances the transducer beam 10 would need to be located in two positions above each row 6 whilst the corresponding actuators 26 are activated to set the upstand height of those studs 5 which were positioned underneath a transducer 12.

Another way of sensing the upstand height of the studs 5 is to rotate them from a datum height and count the number of steps (voltage pulses) applied to the corresponding stepping motor 27. However, one advantage of the transducers 12 is that the plungers 13 replicate the force of the panel on the caps 37 and so this transducer better represents the panel forming procedure.

Finally, if desired the base 21 of the trolley 20 can be mounted on rails extending perpendicular to the row direction to facilitate movement of the trolley 20 from row to row.

We claim:

1. A setting apparatus for setting an upstand distance of studs of an array of studs used to form antenna panels, said array comprising a generally planar bed having a plurality of studs extending substantially normally to the plane of said bed and to opposite sides thereof, said studs being arranged in a plurality of adjacent rows of substantially equal length with a predetermined spacing between each pair of adjacent studs in a row, each of said studs being of adjustable distance relative to a first side of said bed, said distance being adjustable by manipulation of a portion of each said stud on a second side of said bed, said setting apparatus comprising first and second beams each having a length corresponding to the length of said rows, the first of said beams being locatable a predetermined distance away from said first side of said bed and aligned with one of said rows, said first beam carrying a plurality of distance transducers facing said studs and arranged at intervals along said first beam corresponding to a first integral multiple of said inter-row adjacent stud spacing and the second of said beams being locatable adjacent to the second side of said bed, aligned with said row, and carrying a plurality of stud upstand adjusting actuators each engagable with said stud portion, said actuators being arranged at intervals along said second beam corresponding to a second integral multiple of said adjacent stud spacing, and feedback means to control the operation of each said actuator in accordance with an output of the corresponding transducer to set said upstand distance of the corresponding stud.

2. Apparatus as claimed in claim 1 wherein each end of said row terminates in a row post and each said beam is simultaneously engagable with the row posts at an end of a given row to permit the upstand distance of at least some of the studs of said row to be set.

3. Apparatus as claimed in claim 2 wherein said second integral multiple is greater than one and said other beam is engagable with the row posts of any one row in any one of a plurality of positions, each of said positions being separated by an integral multiple of said inter-row adjacent stud spacing.

4. Apparatus as claimed in claim 1 wherein said studs are spring biased in a first direction and said actuators are also spring biased in a second direction, the direction of biasing being opposed and the stud biasing force being greater than the actuator biasing force.

5. Apparatus as claimed in claim 1 wherein said transducers are selected from the group consisting of electric and magnetic transducers and ultrasonic transceiver transducers.

6. A method of setting an upstand distance of studs of an array of studs used to form antenna panels, said array comprising a generally planar bed having a plurality of studs extending to each side of said bed and arranged in a plurality of adjacent rows of substantially equal length with a predetermined spacing between each pair of adjacent studs, each of said studs being of adjustable distance relative to a first side of said bed, said distance being adjustable by manipulation of a portion of each said stud on a second side of said bed, said method comprising the steps of:

(1) engaging a plurality of stud distance adjusting actuators with said stud portion of a corresponding number of said studs in one of said rows, (2) sensing the upstand distance of said corresponding studs in said one row with transducers, (3) operating said actuators in accordance with an output of said transducers to set said upstand distance of said corresponding number of studs, and (4) repeating steps (1)–(3) inclusive for the remaining studs, if any, in said one row, and for the remaining rows, in either order, until the upstand distance of all said studs in said array has been set.

7. A method as claimed in claim 6 wherein steps (2) and (3) comprises locating an aligned pair of optical transducers above, and aligned with said one row, if necessary placing all the studs of said one row at a height below a minimum height, passing a light beam between said transducers at a height corresponding to a lowest of said studs, increasing the height of said lowermost stud until said light beam is interrupted, adjusting the height of the light beam to the next lowermost stud and adjusting the corresponding stud until said light beam is interrupted, and repeating the last step until all the studs in said one row have been set.

8. A method as claimed in claim 6 wherein step (2) comprises locating a corresponding plurality of distance transducers a predetermined distance away from said first side of said bed and aligned with said corresponding studs in said one row.

9. A transducer beam for setting apparatus for setting an upstand distance of studs of an array of studs used to form antenna panels, said array comprising a generally planar bed having a plurality of studs extending to each side of said bed and arranged in a plurality of adjacent rows of substantially equal length with a predetermined spacing between each pair of adjacent studs, each of said studs being of adjustable distance relative to a first side of said bed, said distance being adjustable by manipulation of a portion of each said stud on a second side of said bed, said transducer beam having a length corresponding to the length of said rows, having location means to locate said beam a predetermined distance away from said first side of said bed and aligned with one of said rows, and carrying a plurality of distance transducers facing said studs and arranged at intervals along said beam corresponding to an integral multiple of said adjacent stud spacing.

10. A transducer beam as claimed in claim 9 wherein the integral multiple is one and said transducers are selected from the group consisting of electric and magnetic transducers and ultrasonic transceiver transducers.

11. An actuator beam for setting apparatus for setting an upstand distance of studs of an array of studs used to form antenna panels, said array comprising a generally planar bed having a plurality of studs extending to each side of said bed and arranged in a plurality of adjacent rows of substantially equal length with a predetermined spacing between each pair of adjacent studs, each of said studs being of adjustable distance relative to a first side of said bed, said distance being adjustable by manipulation of a portion of each said stud on a second side of said bed, said actuator beam having a length corresponding to the length of said rows, having location means to locate said beam adjacent the second side of said bed and aligned with one of said rows, and carrying a plurality of stud upstand adjusting actuators each engagable with said stud portion, said actuators being arranged at intervals along said beam corresponding to an integral multiple of said adjacent stud spacing.

12. An actuator beam as claimed in claim 11 and carried above a wheeled carriage by a height adjusting mechanism operable to raise or lower said beam relative to said carriage.

13. An actuator beam as claimed in claim 11 wherein said integral multiple is two and said location means comprises a pair of spaced apart location devices each of which aligns said actuators with a corresponding stud, said location devices being spaced apart by a distance equal to the inter-row stud spacing.

* * * * *